(12) United States Patent
Moss et al.

(10) Patent No.: US 10,436,904 B2
(45) Date of Patent: Oct. 8, 2019

(54) SYSTEMS AND METHODS FOR MODULAR LADAR SCANNING

(71) Applicant: THE BOEING COMPANY, Huntington Beach, CA (US)

(72) Inventors: Robert Douglas Moss, Sylmar, CA (US); Scott B. Singer, Sherman Oaks, CA (US); Alexander C. Standridge, Westlake Village, CA (US); Ping Yuan, Simi Valley, CA (US); Rengarajan Sudharsanan, Stevenson Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 543 days.

(21) Appl. No.: 14/687,201

(22) Filed: Apr. 15, 2015

(65) Prior Publication Data
US 2016/0306043 A1    Oct. 20, 2016

(51) Int. Cl.
| | |
|---|---|
| *G01S 17/42* | (2006.01) |
| *G01S 17/87* | (2006.01) |
| *G01S 17/89* | (2006.01) |
| *G01S 7/481* | (2006.01) |
| *G01S 17/10* | (2006.01) |
| *G01S 17/32* | (2006.01) |

(52) U.S. Cl.
CPC ............ *G01S 17/42* (2013.01); *G01S 7/4817* (2013.01); *G01S 17/87* (2013.01); *G01S 17/89* (2013.01); *G01S 17/10* (2013.01); *G01S 17/325* (2013.01)

(58) Field of Classification Search
CPC ...... G01S 17/023; G01S 17/89; G01S 17/936; G01S 7/481; G01S 7/4813; G01S 7/4818; G01S 7/489; B60T 7/22; B60W 30/08; B60W 2420/52; B62D 15/0265; B60Q 1/0023
See application file for complete search history.

(56) References Cited

U.S. PATENT DOCUMENTS

| | | |
|---|---|---|
| 5,529,138 A | 6/1996 | Shaw et al. |
| 8,752,969 B1 | 6/2014 | Kane et al. |
| 2006/0132752 A1 | 6/2006 | Kane |
| 2010/0053330 A1* | 3/2010 | Hellickson ............ G01S 17/023 348/153 |
| 2010/0165322 A1 | 7/2010 | Kane et al. |

(Continued)

FOREIGN PATENT DOCUMENTS

EP    2806288 A1    11/2014

OTHER PUBLICATIONS

Combined Search and Examination Report of Application No. GB1606584.9, dated Jun. 6, 2016, 6 pages.

*Primary Examiner* — Luke D Ratcliffe
(74) *Attorney, Agent, or Firm* — Armstrong Teasdale LLP (57) ABSTRACT

A laser distance and ranging (LADAR) array is provided. The LADAR array includes a plurality of LADAR modules, each LADAR module configured to scan a laser beam through a field of view (FOV) and output a signal indicative of a distance between each LADAR module and objects in the FOV that the laser beam is incident upon, and a central processing device communicatively coupled to the plurality of LADAR modules, the central processing device configured to generate an output based at least in part on the signals of each LADAR module.

10 Claims, 9 Drawing Sheets

(56) References Cited

U.S. PATENT DOCUMENTS

| | | |
|---|---|---|
| 2013/0242284 A1 | 9/2013 | Zeng |
| 2013/0242285 A1 | 9/2013 | Zeng |
| 2014/0340487 A1* | 11/2014 | Gilliland ............... G01S 7/4863 |
| | | 348/48 |
| 2014/0350836 A1* | 11/2014 | Stettner ................. G01S 17/023 |
| | | 701/301 |
| 2016/0313445 A1 | 10/2016 | Bailey et al. |

* cited by examiner

SYSTEMS AND METHODS FOR MODULAR LADAR SCANNING

BACKGROUND

The field of the disclosure relates generally to laser distance and ranging (LADAR) modules, and, more particularly, to a LADAR array that combines outputs from a plurality of individual LADAR modules.

Laser distance and ranging (LADAR) systems generate images by transmitting a laser, collecting scatter information when the laser contacts an object, and generating an image using the scatter information. At least some known LADAR systems have a lateral field of view (FOV) of approximately 50°. To increase this FOV, different techniques may be implemented.

For example, at least some LADAR systems use one or more laser beams that are generated by mounting a laser source onto a rotating gimbal. The laser source is then rotated and a plurality of images are acquired at different angles and combined to form a single image. However, such LADAR systems rely on a time of flight concept to acquire backscatter information, which is relatively time-consuming. Specifically, the laser source must be rotated at a sufficiently slow speed to enable the laser beam to be transmitted to the object and receive backscatter from the object. Further, at least some known LADAR systems with larger FOVs are relatively complex, relatively expensive, and relatively difficult to repair.

BRIEF DESCRIPTION

In one aspect, a laser distance and ranging (LADAR) array is provided. The LADAR array includes a plurality of LADAR modules, each LADAR module configured to scan a laser beam through a field of view (FOV) and output a signal indicative of a distance between each LADAR module and objects in the FOV that the laser beam is incident upon, and a central processing device communicatively coupled to the plurality of LADAR modules, the central processing device configured to generate an output based at least in part on the signals of each LADAR module.

In another aspect, a method of assembling a laser distance and ranging (LADAR) array is provided. The method includes arranging a plurality of LADAR modules, each LADAR module configured to scan a laser beam through a field of view (FOV) and output a signal indicative of a distance between each LADAR module and objects in the FOV that the laser beam is incident upon, and communicatively coupling the plurality of LADAR modules to a central processing device, wherein the central processing device is configured to generate an output based at least in part on the signals output from each LADAR module.

In yet another aspect, a method of operating a LADAR array is provided. The method includes receiving, at a central processing unit, signals from each of a plurality of LADAR modules, each LADAR module configured to scan a laser beam through a field of view (FOV) and output a signal indicative of a distance between each LADAR module and objects in the FOV that the laser beam is incident upon, and processing, at the central processing unit, the received signals to generate an output.

DETAILED DESCRIPTION

The implementations described herein are directed to a laser distance and ranging (LADAR) array that uses a plurality of separate LADAR modules. A central processing device combines signals from each of the plurality of LADAR modules to generate an output (e.g., a three-dimensional image of an environment in the field of views (FOVs) of the LADAR modules). By using a plurality of LADAR modules, a total FOV and an image resolution of the array are greater than the FOV and image resolution of a single LADAR module operating alone. Further, the individual LADAR modules are relatively inexpensive, relatively small, and not overly complex, reducing the cost of the LADAR array described herein relative to other LADAR systems having a relatively large FOV.

Combining a plurality of LADAR modules into a single array, without other modifications, may cause the individual LADAR modules to interfere with one another. For example, multiple LADAR modules may interfere with one another, as the light from one LADAR module will scatter in many directions, including into other LADAR modules, leading to false detections. Further, unless clock rates of each LADAR module are properly aligned, signals from different LADAR modules will interfere, or beat, with one another. Accordingly, in the implementations described herein, a central processing device includes a common clock that facilitates synching the clock rates of each LADAR module. The central processing device may also track the orientation and position of the LADAR modules relative to each other.

Figure 1:
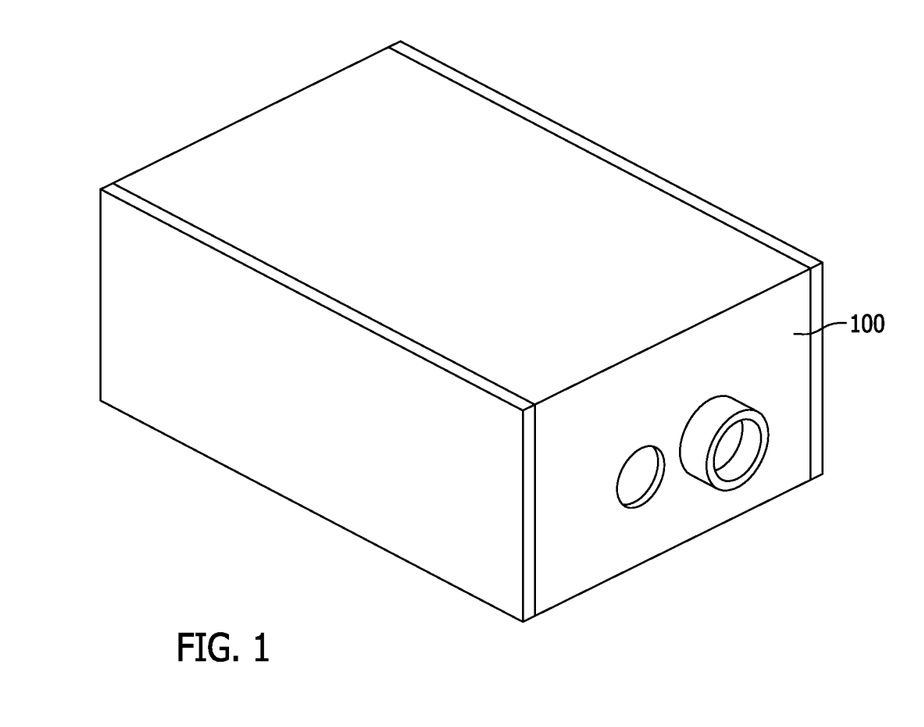
FIG. 1 is a perspective view of an exemplary LADAR module.
Figure 2:
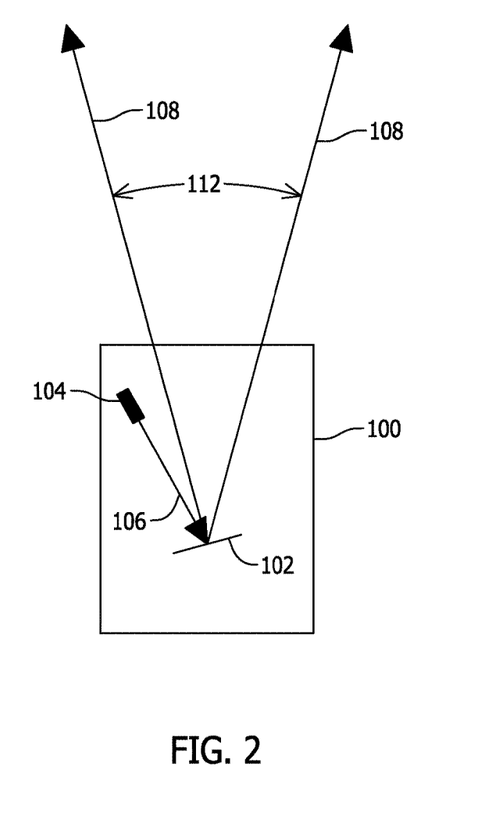
FIG. 2 is a schematic diagram of the LADAR module shown in FIG. 1.

FIG. 1 is a perspective view of an exemplary laser distance and ranging (LADAR), or LIDAR, module 100. FIG. 2 is a schematic diagram of LADAR module 100. In the exemplary implementation, LADAR module 100 includes a two-axis scan mirror 102 (i.e., a mirror able to rotate about two separate rotational axes (e.g., a tip axis and a tilt axis) that are orthogonal to one another) and a laser source 104 that emits a laser beam 106 onto scan mirror 102 such that laser beam 106 is reflected by scan mirror 102 to generate a reflected laser beam 108. Laser beam 106 may be any type or wavelength laser that has been collimated into a beam having relatively low divergence.

To scan an environment, scan mirror 102 rotates or tilts such that reflected laser beam 108 scans, or sweeps, across an environment to generate a three-dimensional map, or image, of the environment. Notably, scan mirror 102 has a finite size and scan angle. As used herein, a 'scan angle' refers to the angle through which scan mirror 102 can sweep reflected laser beam 108 (e.g., about the tip axis or the tilt axis). A scan angle 112 of LADAR module 100 may be, for example, approximately 25°. In the exemplary implementation, scan mirror 102 is a microelectromechanical system (MEMS) mirror having a relatively small size, weight, and power. Alternatively, scan mirror 102 may be any mirror that enables LADAR module 100 to function as described herein.

Figure 3:
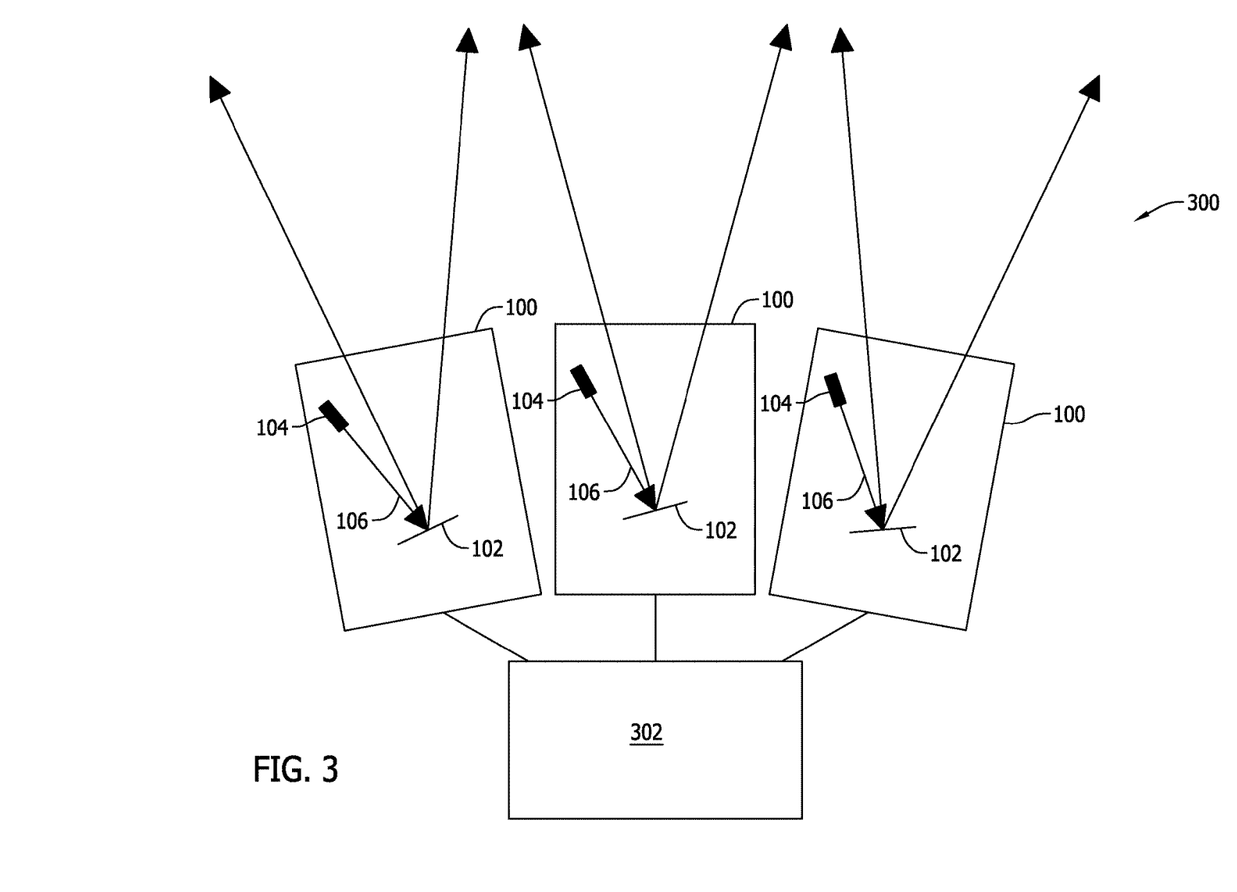
FIG. 3 is a schematic diagram of an exemplary LADAR array.

FIG. 3 is a schematic diagram of a LADAR array 300. As shown in FIG. 3, LADAR array 300 includes a plurality of LADAR modules 100. In the exemplary implementation, LADAR array 300 includes three LADAR modules 100. Alternatively, LADAR array 300 may include any number of LADAR modules 100. Each LADAR module 100 is communicatively coupled (e.g., via a wired or wireless connection) to a central processing device 302, which combines signals output from each LADAR module 100, as described in detail below. Notably, the configuration of LADAR array 300 is modular. Accordingly, LADAR modules 100 may be selectively added to and/or removed from LADAR array 300 to adjust a total field of view (FOV) and image resolution of LADAR array 300, as described herein.

LADAR array 300 may be implemented in any suitable setting. For example, LADAR array 300 may be installed onboard a manned vehicle (e.g., an aircraft), onboard an unmanned vehicle (e.g., an unmanned aerial vehicle (UAV), or onboard a robotics platform. Further, LADAR array 300 may be used in a variety of applications, including imaging applications, obstacle detection applications, and mapping applications. Moreover, LADAR array 300 may be coupled to and/or communicate with other sensors (e.g., GPS sensors) in a system.

Notably, each LADAR module 100 has a separate field of view (FOV). In some implementations, each LADAR module 100 has the same FOV (i.e., a FOV with the same dimensions). Optionally, a portion of LADAR modules 100 may have a first FOV and at least one LADAR module 100 may have a second, different FOV. Accordingly, LADAR modules 100 can be arranged (as shown in FIG. 3) such that the FOV of each LADAR module 100 does not overlap with the FOVs of the other LADAR modules 100. This enables LADAR array 300 to capture a substantially wider FOV than would be possible using a single LADAR module 100. For example, in some implementations, LADAR array 300 may include a sufficient number of LADAR modules 300 such that the total FOV of the array 300 is approximately 360° by 360°. Alternatively, LADAR modules 100 may be arranged such that at least a portion of the FOVs of LADAR modules 100 overlap one another. Overlapping FOVs of LADAR modules 100 results in increased resolution of LADAR array 300, as described herein. In some implementations, LADAR modules 100 have a shared aperture design.

Figure 4:
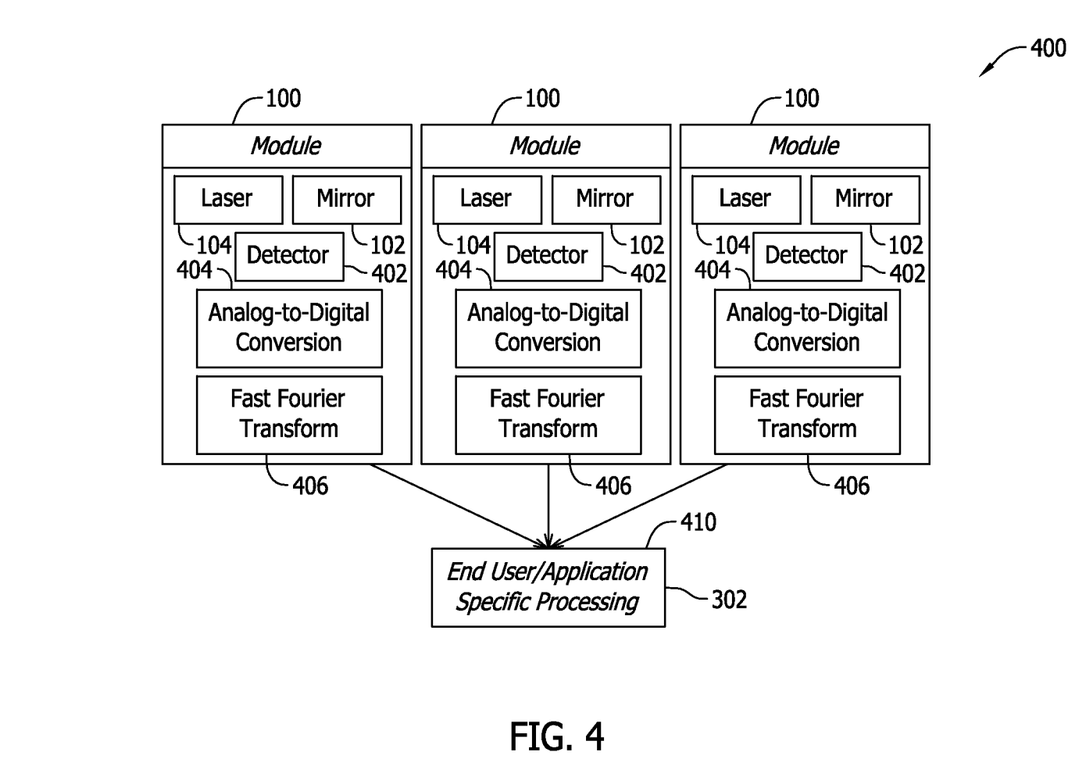
FIG. 4 is a block diagram of one implementation of a data flow within the LADAR array shown in FIG. 3.

FIG. 4 is a block diagram of one implementation of a data flow 400 within LADAR array 300. As shown in FIG. 4, for scanning the environment, each LADAR module 100 includes laser source 104, scan mirror 102, and a detector 402 that detects the distance from LADAR module 100 to an object that reflected laser beam 108 is incident upon. Specifically, as reflected laser beam 108 scans the environment, detector 402 detects the distance between LADAR module 100 and an object that reflected laser beam 108 is currently incident upon (e.g., based on backscatter from the object), and outputs a corresponding signal. The distance detection may either be coherent or incoherent. In the incoherent case, detector 402 is sampled at a high sample rate. Collected samples are then thresholded to find a peak, which indicates an optical return pulse. The sample at which the peak occurs corresponds to the distance of the object. In the coherent case, the return signal of reflected laser beam 108 is coherently mixed with a reference signal to create a beat frequency signal. The beat frequency signal is then passed to a fast Fourier transform (FFT) algorithm that generates a peak frequency proportional to the distance of the object.

For processing the analog signals output by detector 402, in the implementation of FIG. 4, each LADAR module 100 includes an analog-to-digital conversion unit 404 and a fast Fourier transformation unit 406. Analog-to-digital conversion unit 404 and a fast Fourier transformation unit 406 may be implemented using a computing device, as described in detail below. The processed signals are output from each LADAR module 100 to block 410 for display to an end user and/or further application specific processing. For example, at block 410, the processed signals received from each LADAR module 100 may be integrated with one another to generate a comprehensive three-dimensional image of the environment containing data from all of the LADAR modules 100 in array 300. In the exemplary implementation, the display and/or processing of block 410 may be performed, for example, by central processing device 302.

Figure 5:
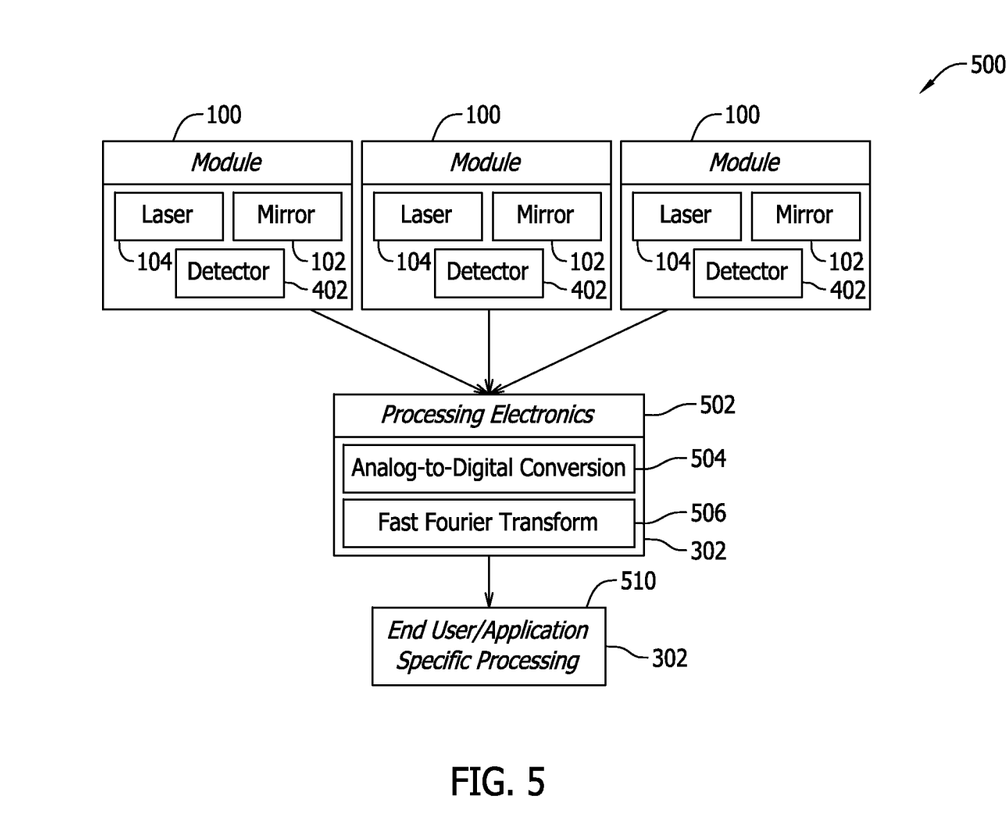
FIG. 5 is a block diagram of another implementation of a data flow within the LADAR array shown in FIG. 3.

FIG. 5 is a block diagram of an alternative implementation of a data flow 500 within array 300. In the implementation shown in FIG. 5, in contrast to data flow 400, instead of processing signals from detectors 402 at each LADAR module 100, analog signals from detectors 402 are transmitted to processing electronics 502 for processing by a central analog-to-digital conversion unit 504 and a central fast Fourier transformation unit 506. In the exemplary implementation, processing electronics 502 may be implemented, for example as part of central processing device 302. The processed signals are output from processing electronics 502 to block 510 for display to an end user and/or further application specific processing. For example, at block 510, the processed signals received from processing electronics 502 may be used to generate a comprehensive three-dimensional image of the environment containing data from all of the LADAR modules 100 in array 300. In the exemplary implementation, the display and/or processing of block 510 may be performed, for example, by central processing device 302, or by a separate computing device. In yet another implementation, each LADAR module 100 may include an analog-to-digital conversion unit and provide outputs to a shared Fourier transformation unit. The arrangement of the analog-to-digital conversion unit(s) and the Fourier transformation unit(s) may depend on, for example, cost considerations, size considerations, weight considerations, power considerations, and/or other considerations.

In the exemplary implementation, central processing device 302 includes a common clock (e.g., implemented using a processor) that facilitates synching a respective clock of each LADAR module 100. Without synching the clocks of each LADAR modules 100, signals from LADAR modules 100 may interfere with one another. Further, to combine data from multiple LADAR modules 100, central processing device 302 may track an orientation and position (e.g., relative to other LADAR modules 100) of each LADAR module 100. For example, in one implementation, each LADAR module 100 transmits position and orientation data to central processing device 302. The position and orientation data may be, for example, calculated relative to Earth's gravity and magnetic field, and may be generated, for example, using an inertial measurement unit or equivalent device. Using the position and orientation data, central processing device 302 combines signals from each LADAR module 100 in a comprehensive, absolute reference frame.

Figure 6A:
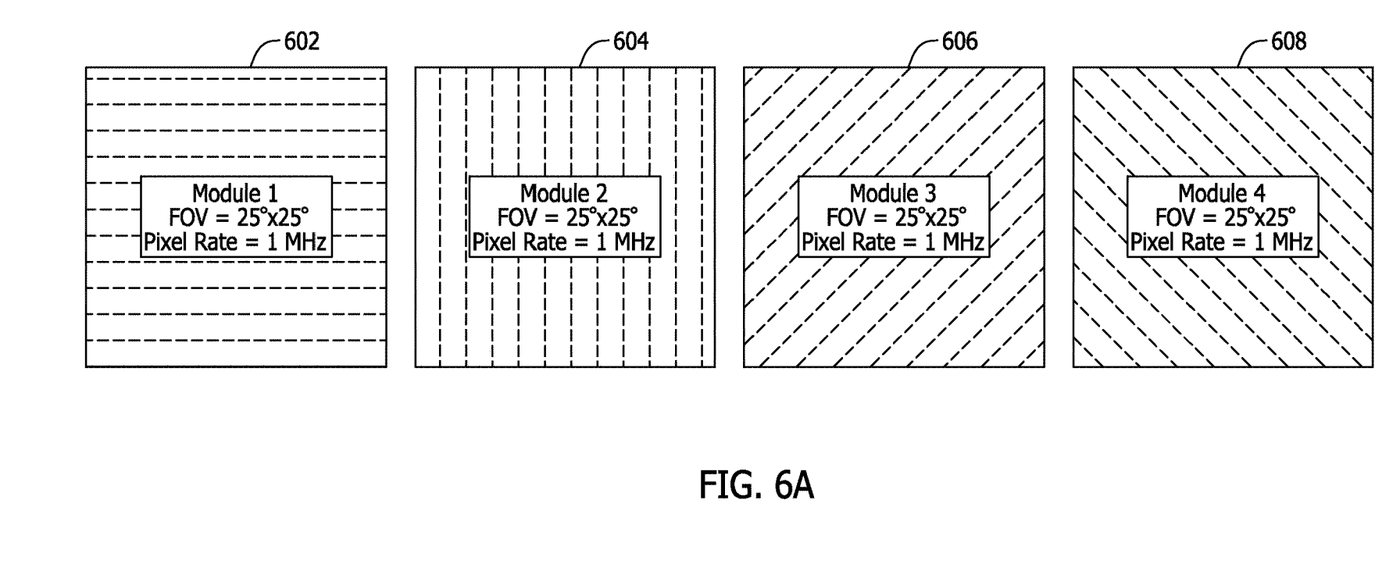
FIGS. 6A-6D are diagrams illustrating examples of how field of views (FOVs) of multiple LADAR modules may be combined.

FIGS. 6A-6D are diagrams illustrating how the FOVs of multiple LADAR modules 100 can be combined to cover a wider total FOV and/or increase an imaging resolution. As shown in FIG. 6A, assume a first LADAR module 602 has a FOV of 25° by 25°, and a pixel rate of 1 megahertz (MHz). Further, assume a second, third, and fourth LADAR module 604, 606, and 608 have the same parameters.

Figure 6B:
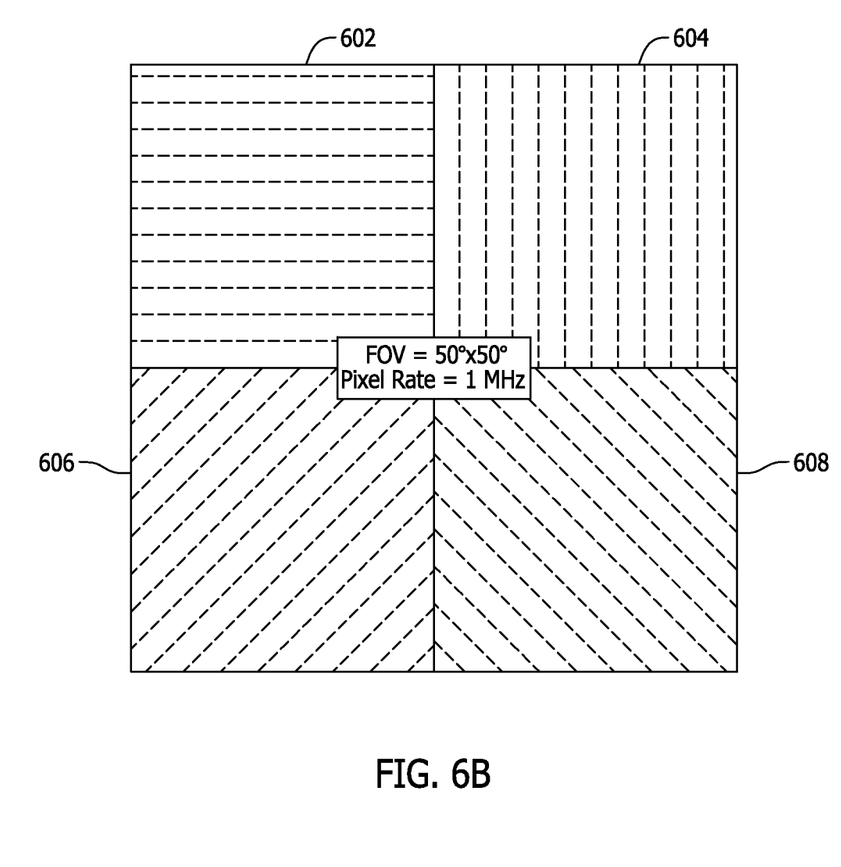
Figure 6C:
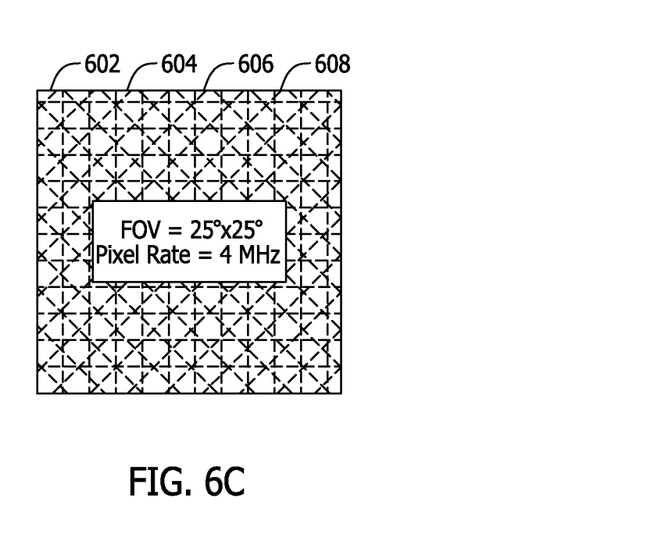

As shown in FIG. 6B, by arranging first, second, third, and fourth LADAR module 602, 604, 606, and 608 such that the FOVs of modules 602, 604, 606, and 608 are adjacent but non-overlapping, a total FOV of 50° by 50° with a pixel rate of 1 MHz can be achieved. Additionally, and as shown in FIG. 6C, by arranging first, second, third, and fourth LADAR modules 602, 604, 606, and 608 such that the FOVs of modules 602, 604, 606, and 608 entirely overlap, the total FOV is the same as it would be for one module (e.g., 25° by 25°), but the pixel rate is now 4 MHz.

Figure 6D:
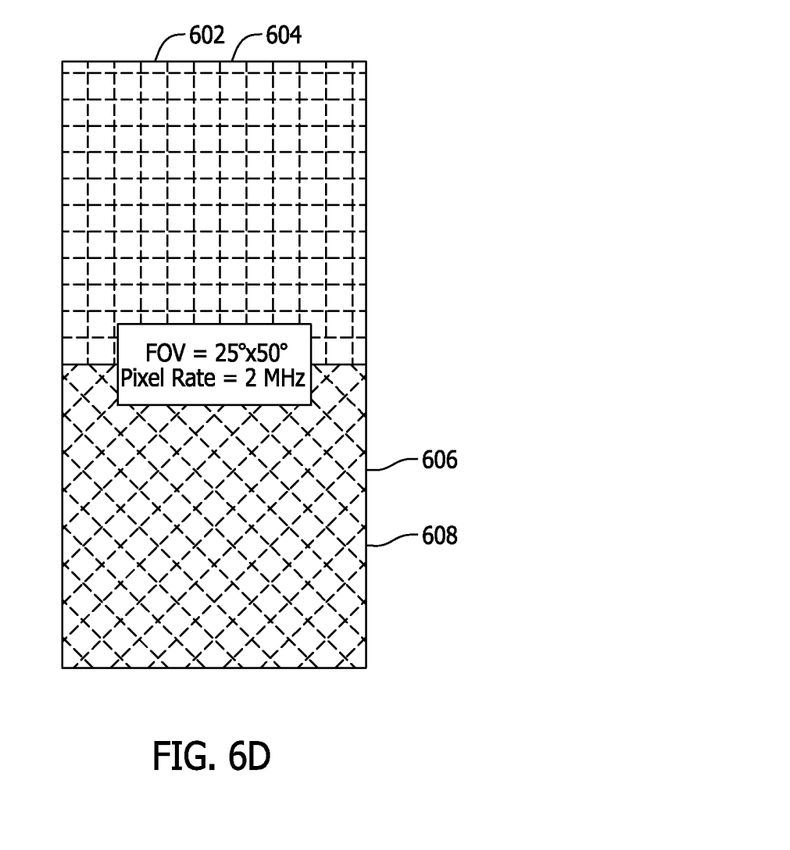

As another example, in FIG. 6D, first and second LADAR modules 602 and 604 are arranged to overlap entirely, and third and fourth LADAR modules 606 and 608 are arranged to overlap entirely. This results in a total FOV of 25° by 50° with a pixel rate of 2 MHz. Notably, the arrangements shown in FIGS. 6B-6D are merely examples, and those of skill in the art will appreciate that many different arrangements of multiple LADAR modules 100 are within the spirit and scope of this disclosure.

In implementations where FOVs of multiple LADAR modules 100 overlap, the phases of the overlapping modules 100 may be offset to avoid interference. For example, driving of laser sources 104 for each laser module 100 may be modulated with different parts of the common clock of central processing device 302. In some implementations, laser sources 104 are controlled so that laser transmit pulses are offset such that a time it takes for a first LADAR module 100 to transmit and receive does not overlap with a second LADAR module's 100 transmission.

Figure 7:
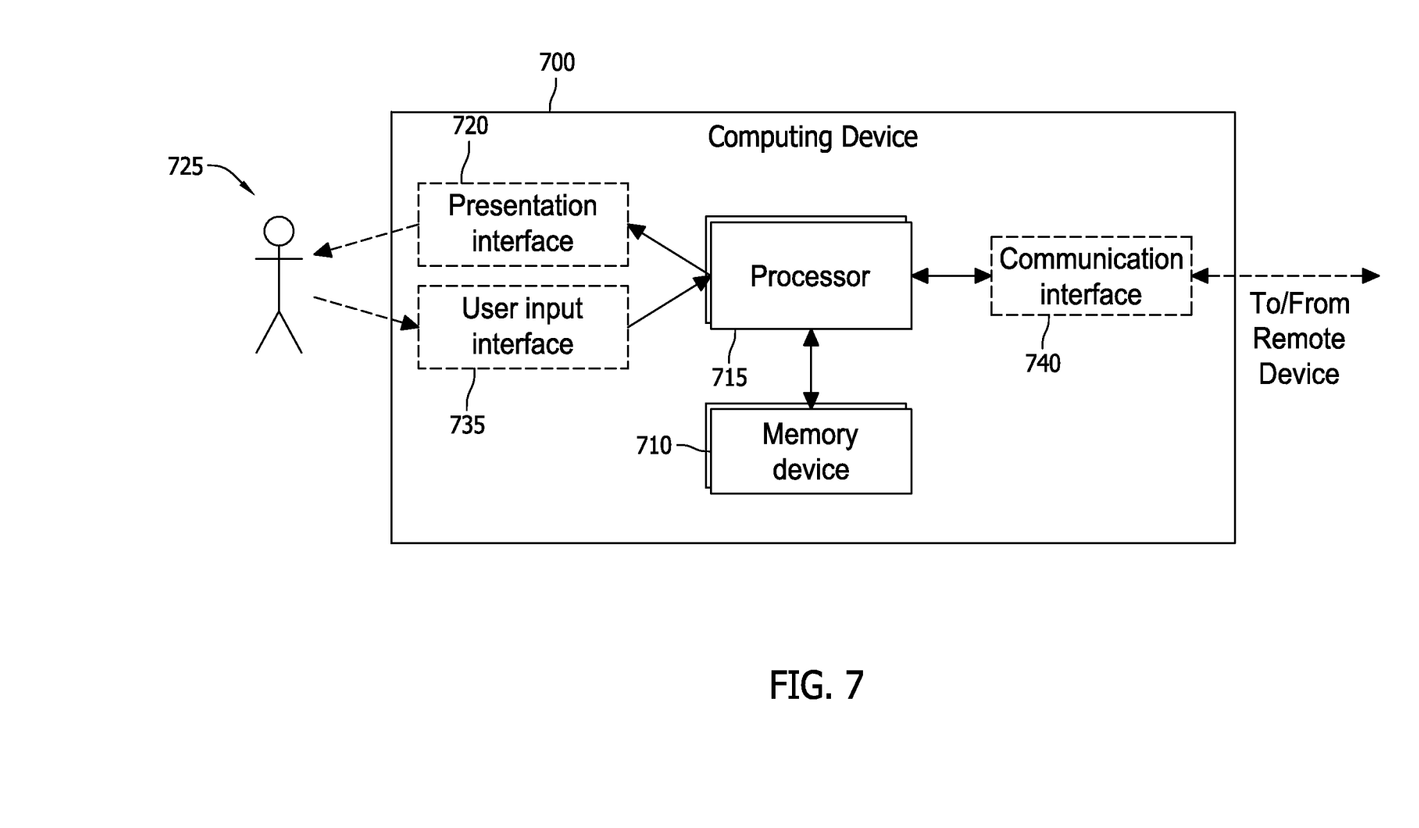
FIG. 7 is a block diagram of an exemplary computing device that may be used with the LADAR array shown in FIG. 3.

FIG. 7 is a block diagram of a computing device 700 that may be used with the implementations described herein. For example, LADAR modules 100, central processing device 302, and/or processing electronics 502 may be implemented using computing device 700. Computing device 700 includes at least one memory device 710 and a processor 715 that is coupled to memory device 710 for executing instructions. In some implementations, executable instructions are stored in memory device 710. In the exemplary implementation, computing device 700 performs one or more operations described herein by programming processor 715. For example, processor 715 may be programmed by encoding an operation as one or more executable instructions and by providing the executable instructions in memory device 710.

Processor 715 may include one or more processing units (e.g., in a multi-core configuration). Further, processor 715 may be implemented using one or more heterogeneous processor systems in which a main processor is present with secondary processors on a single chip. In another illustrative example, processor 715 may be a symmetric multi-processor system containing multiple processors of the same type. Further, processor 715 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary implementation, memory device 710 is one or more devices that enable information such as executable instructions and/or other data to be stored and retrieved. Memory device 710 may include one or more computer readable media, such as, without limitation, dynamic random access memory (DRAM), static random access memory (SRAM), a solid state disk, and/or a hard disk. Memory device 710 may be configured to store, without limitation, application source code, application object code, source code portions of interest, object code portions of interest, configuration data, execution events and/or any other type of data.

In the exemplary implementation, computing device 700 includes a presentation interface 720 that is coupled to processor 715. Presentation interface 720 presents information to a user 725. For example, presentation interface 720 may include a display adapter (not shown) that may be coupled to a display device, such as a cathode ray tube (CRT), a liquid crystal display (LCD), an organic LED (OLED) display, and/or an "electronic ink" display. In some implementations, presentation interface 720 includes one or more display devices.

In the exemplary implementation, computing device 700 includes a user input interface 735. User input interface 735 is coupled to processor 715 and receives input from user 725. User input interface 735 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 720 and user input interface 735.

Computing device 700, in the exemplary implementation, includes a communication interface 740 coupled to processor 715. Communication interface 740 communicates with one or more remote devices. To communicate with remote devices, communication interface 740 may include, for example, a wired network adapter, a wireless network adapter, and/or a mobile telecommunications adapter.

The systems and methods described herein are directed to a laser distance and ranging (LADAR) array that uses a plurality of separate LADAR modules. A central processing device combines signals from each of the plurality of LADAR modules to generate an output (e.g., a three-dimensional image of an environment in the field of views (FOVs) of the LADAR modules). By using a plurality of LADAR modules, a total FOV and an image resolution of the array are greater than the FOV and image resolution of a single LADAR module operating alone. Further, the individual LADAR modules are relatively inexpensive, relatively small, and not overly complex, reducing the cost of the LADAR array described herein relative to other LADAR systems having a relatively large FOV. These advantages provide many benefits directly to a wide range of LADAR applications.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A laser distance and ranging (LADAR) array comprising:
    a plurality of LADAR modules, each said LADAR module comprising a two-axis scan mirror configured to scan a laser beam through a field of view (FOV), and each said LADAR module configured to output a signal indicative of a distance between each said LADAR module and objects in the FOV that the laser beam is incident upon; and a central processing device communicatively coupled to said plurality of LADAR modules, said central processing device configured to generate an output based on combining the signals of each said LADAR module, wherein said plurality of LADAR modules comprises at least a first LADAR module having a first FOV and a second LADAR module having a second FOV, wherein said first and second LADAR modules are arranged such that the first FOV is non-overlapping with the second FOV, wherein the first FOV and the second FOV are adjacent such that an edge of the first FOV is aligned with and oriented parallel to an edge of the second FOV, wherein the output combines the first FOV and the second FOV into a third FOV, wherein said first LADAR module operates at a first phase and said second LADAR module operates at a second phase, and wherein the first phase is offset with respect to the second phase.

2. A LADAR array in accordance with claim 1, wherein each said LADAR module has an individual FOV and a same pixel rate, and wherein said central processing device is configured to generate an image having a combined FOV that is larger than the individual FOV.

3. A LADAR array in accordance with claim 1, wherein said central processing device comprises
   a central analog-to-digital conversion unit; and
   a central fast Fourier transformation unit, said central analog-to-digital conversion unit and said central fast Fourier transformation unit configured to process the signals from each said LADAR module.

4. A method of assembling a laser distance and ranging (LADAR) array, said method comprising:
   arranging a plurality of LADAR modules, each LADAR module including a two-axis scan mirror configured to scan a laser beam through a field of view (FOV), and each LADAR module configured to output a signal indicative of a distance between each LADAR module and objects in the FOV that the laser beam is incident upon, wherein each LADAR module has a same pixel rate, wherein arranging a plurality of LADAR modules comprises arranging a first LADAR module having a first FOV and a second LADAR module having a second FOV such that the first FOV entirely overlaps with the second FOV, wherein the first LADAR module operates at a first phase and the second LADAR module operates at a second phase, and wherein the first phase is offset with respect to the second phase; and
   communicatively coupling the plurality of LADAR modules to a central processing device, wherein the central processing device is configured to generate an output based on combining the signals output from each LADAR module.

5. A method in accordance with claim 4, wherein communicatively coupling the plurality of LADAR modules to a central processing device comprises communicatively coupling the plurality of LADAR modules to a central processing device that includes a central analog-to-digital conversion unit, and a central fast Fourier transformation unit, the central analog-to-digital conversion unit and the central fast Fourier transformation unit configured to process the signals from each of the plurality of LADAR modules.

6. A method of operating a LADAR array, said method comprising:
   receiving, at a central processing unit, signals from each of a plurality of LADAR modules, each LADAR module including a two-axis scan mirror configured to scan a laser beam through a field of view (FOV), and each LADAR module configured to output a signal indicative of a distance between each LADAR module and objects in the FOV that the laser beam is incident upon, wherein receiving signals comprises receiving signals from a first LADAR module operating at a first phase and a second LADAR module operating at a second phase, and wherein the first phase is offset with respect to the second phase; and
   processing, at the central processing unit, the received signals to generate an output.

7. A method in accordance with claim 6, wherein processing the received signals comprises processing the received signals to generate a three-dimensional image of an environment within the FOVs of the plurality of LADAR modules.

8. A method in accordance with claim 6, wherein the first LADAR module has a first FOV and the second LADAR module has a second FOV, wherein the first and second LADAR modules are arranged such that the first FOV is non-overlapping with the second FOV, wherein the first FOV and the second FOV are adjacent such that an edge of the first FOV is aligned with an edge of the second FOV, and wherein the output combines the first FOV and the second FOV into a third FOV.

9. A method in accordance with claim 6, wherein the first LADAR module has a first FOV and the second LADAR module has a second FOV, and wherein the first and second LADAR modules are arranged such that the first FOV partially overlaps with the second FOV.

10. A method in accordance with claim 6, wherein the first LADAR module has a first FOV and the second LADAR module has a second FOV, wherein the first and second LADAR modules are arranged such that the first FOV entirely overlaps with the second FOV.

* * * * *